(12) United States Patent
Soma et al.

(10) Patent No.: US 11,081,940 B2
(45) Date of Patent: Aug. 3, 2021

(54) VEHICULAR DRIVE SYSTEM

(71) Applicant: HONDA MOTOR CO., LTD., Tokyo (JP)

(72) Inventors: Shingo Soma, Wako (JP); Yutaka Arimura, Wako (JP); Daisuke Hoshino, Wako (JP); Tatsuya Ohzu, Wako (JP); Yosuke Tanaka, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 65 days.

(21) Appl. No.: 16/285,833

(22) Filed: Feb. 26, 2019

(65) Prior Publication Data

US 2019/0267869 A1 Aug. 29, 2019

(30) Foreign Application Priority Data

Feb. 27, 2018 (JP) .............................. JP2018-032675

(51) Int. Cl.
| | | |
|---|---|---|
| *H02K 11/24* | (2016.01) | |
| *H02K 7/08* | (2006.01) | |
| *H02K 11/21* | (2016.01) | |
| *G01P 3/44* | (2006.01) | |
| *G01L 3/10* | (2006.01) | |
| *B60K 6/26* | (2007.10) | |

(52) U.S. Cl.
CPC .............. *H02K 11/24* (2016.01); *G01L 3/102* (2013.01); *G01P 3/44* (2013.01); *H02K 7/083* (2013.01); *H02K 11/21* (2016.01); *B60K 6/26* (2013.01); *B60Y 2200/92* (2013.01)

(58) Field of Classification Search
CPC ........ H02K 11/24; H02K 11/21; H02K 7/003; H02K 7/083; H02K 24/00; G01L 3/102; G01P 3/44; B60K 6/26; B60Y 2200/92

USPC .............................................. 310/68 B, 75 R
See application file for complete search history.

(56) References Cited

U.S. PATENT DOCUMENTS

| | | | |
|---|---|---|---|
| 2005/0124457 A1 | 6/2005 | Nakamori et al. | |
| 2009/0107756 A1* | 4/2009 | Miyoshi | H02K 29/12 180/444 |
| 2012/0229005 A1* | 9/2012 | Tominaga | H02K 11/38 310/68 B |
| 2015/0275966 A1* | 10/2015 | Tremelling | F16C 3/026 310/90.5 |

(Continued)

FOREIGN PATENT DOCUMENTS

| | | |
|---|---|---|
| JP | S60-172029 U | 11/1985 |
| JP | S63-121448 A | 5/1988 |

(Continued)

OTHER PUBLICATIONS

Machine translation of JP-2005045916-A. (Year: 2005).*

(Continued)

*Primary Examiner* — Michael Andrews
(74) *Attorney, Agent, or Firm* — Carrier Blackman & Associates, P.C.; William D. Blackman; Joseph P. Carrier

(57) ABSTRACT

A drive motor includes a torque sensor on an outer circumference of a shaft. The drive motor includes a rotor, a rotor shaft arranged inside the rotor, and an output shaft that is joined to the rotor shaft by a joint having a loose element. In the drive motor, the output shaft outputs rotational force of the rotor shaft to the output side. The torque sensor is arranged on an upstream side of the joint in a range not overlapping with the joint.

9 Claims, 4 Drawing Sheets

(56) References Cited

U.S. PATENT DOCUMENTS

2016/0111985 A1* 4/2016 Yoneda ................ B62D 5/0463
                                                                    180/446
2017/0158043 A1* 6/2017 Tsukamoto ............ B60K 6/442

FOREIGN PATENT DOCUMENTS

| JP | 2004-353782 A |   | 12/2004 |
|----|---------------|---|---------|
| JP | 2005-045916 A |   | 2/2005  |
| JP | 2005045916 A  | * | 2/2005  |
| JP | 2005-240959 A |   | 9/2005  |
| JP | 2017-100590 A |   | 6/2017  |

OTHER PUBLICATIONS

Office Action dated Nov. 12, 2019 issued over the corresponding Japanese Patent Application No. 2018-032675 with the English translation thereof.

* cited by examiner

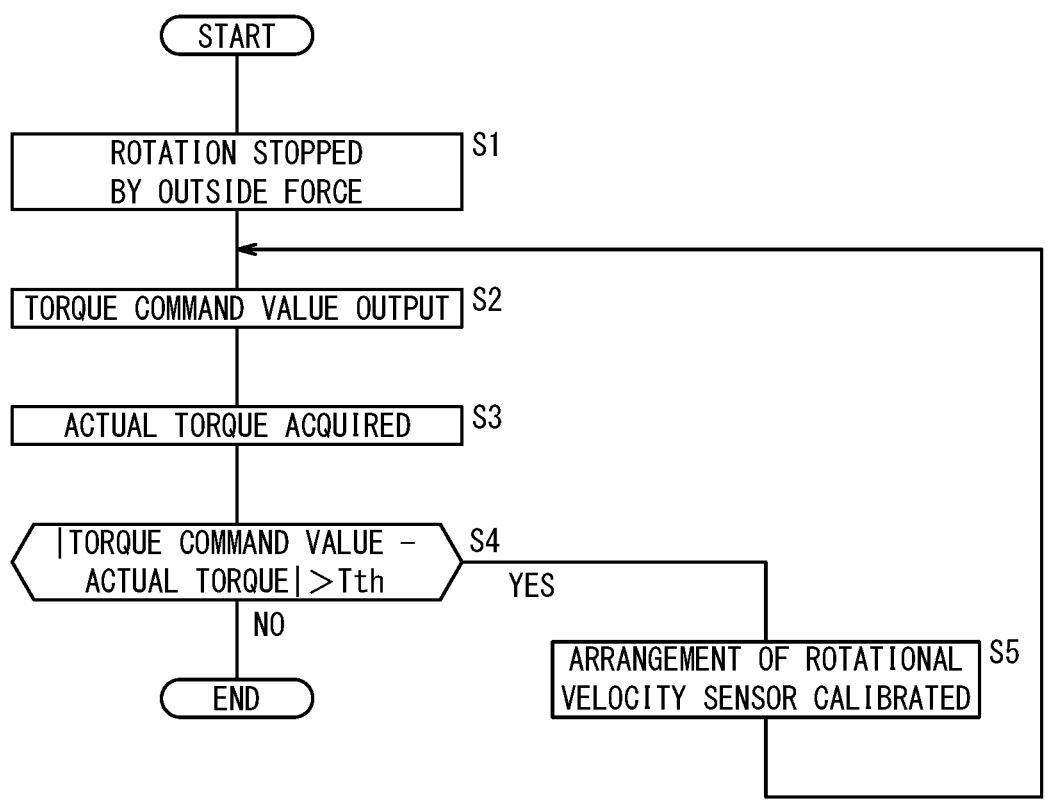

VEHICULAR DRIVE SYSTEM

CROSS-REFERENCE TO RELATED APPLICATION

This application is based upon and claims the benefit of priority from Japanese Patent Application No. 2018-032675 filed on Feb. 27, 2018, the contents of which are incorporated herein by reference.

BACKGROUND OF THE INVENTION

Field of the Invention

The present invention relates to a drive motor that drives a vehicle, for example, and an examination of a final product in which this drive motor is mounted.

Description of the Related Art

Japanese Laid-Open Patent Publication No. 2004-353782 describes a two-motor split type of vehicle drive apparatus that includes a step-variable transmission device, and the vehicle drive device is capable of reliably supplying the hydraulic pressure needed to engage the friction engagement means even before the engine is driven.

In this vehicle drive apparatus, an output shaft that can receive the drive force of the second motor is provided with a torque sensor that senses the torque acting on this shaft.

SUMMARY OF THE INVENTION

When examining the final product, an actual vehicle is used and the examination is performed using the method below. Specifically, motor current that causes a prescribed torque is made to flow to the drive motor of the vehicle and the torque occurring in the output shaft is detected, thereby determining whether a prescribed torque occurs. If the result of the determination is that the prescribed torque is not exhibited, it is determined that the angle information of the rotational velocity sensor is skewed.

As such a final product examination, if calibration of the rotational velocity sensors (adjustment of the arrangement or the like) is performed, for example, each rotational velocity sensor arranged at the tip of the rotor shaft of the vehicle has to be removed each time this calibration is performed. Since it is necessary to jack up the vehicle and perform calibration of the arrangement position of the rotational velocity sensor, a long time is needed to calibrate a single rotational velocity sensor.

The present invention takes the above problems into consideration, and it is an objective of the present invention to provide a drive motor and final product examination method making it possible to easily perform calibration of a rotational velocity sensor (rotation number sensor) arranged in the drive motor and to reduce the number of steps in and the time needed for the final product examination process.

[1] The drive motor according to a first aspect of the present invention is a drive motor in which a magnetostrictive torque sensor is arranged on an outer circumference of a shaft, the drive motor comprising a rotor; a rotor shaft arranged within the rotor; and an output shaft that is joined to the rotor shaft by a joint having a loose element, and transmits rotational force of the rotor shaft to an output side, wherein the magnetostrictive torque sensor is arranged on an upstream side of the joint, in a range not overlapping with the joint.

The spline joint, a coupling joint, or the like are examples of the joint having a loose element, but the joint having a loose element is not limited to these examples, and other joint structures can be favorably used as long as it is a joint with a loose element.

By arranging the magnetostrictive torque sensor on the upstream side of the joint, it is possible to easily sense the output characteristics of the drive motor. Therefore, it is also possible to easily calibrate a prescribed characteristic of the drive motor, based on the output characteristic of the drive motor.

[2] The first aspect of the present invention, may comprise a bearing that rotationally supports the rotor shaft, and the magnetostrictive torque sensor may be arranged closer to the output side than the bearing.

Since the rotor, the bearing, and the magnetostrictive torque sensor are arranged in the stated order from the rotor to the output side, the bearing can function as a magnetic shield for the magnetism generated from the rotor and the like. In this way, it is possible to restrict the occurrence of noise due to magnetic fields and the like.

[3] The first aspect of the present invention may include a rotational velocity sensor that senses rotational velocity of the rotor, the rotational velocity sensor may be arranged at one end side of the rotor that is not a torque transmission path, and the magnetostrictive torque sensor may be arranged at another end side of the rotor that is a torque transmission path.

By arranging the rotational velocity sensor (rotation number sensor) at the one end side of the rotor, the rotational velocity sensor is less affected by the torque transmitted in accordance with the rotation of the rotor, and it is possible to accurately sense the rotational velocity (number of rotations) of the rotor. Furthermore, by providing the magnetostrictive torque sensor at the other end side of the rotor, the magnetostrictive torque sensor is less affected by noise from the rotational velocity sensor, and it is possible to improve the torque detection accuracy.

Even if the rotational velocity sensor loses functionality due to an impact or the like, it is possible to implement rotational control of the rotor based on the torque sensed by the magnetostrictive torque sensor. For example, by feeding back to the control section the difference between the torque command value from the control section that controls the drive motor and the actual torque detected by the magnetostrictive torque sensor, it is possible to implement rotational control of the rotor. In other words, rotational control using the magnetostrictive torque sensor can be made to function as a failsafe until the damaged rotational velocity sensor is replaced with a normal rotational velocity sensor.

[4] The first aspect of the present invention may be configured as a single unit in which a drive motor body including the rotor and the rotor shaft, a rotational velocity sensor, and the magnetostrictive torque sensor are formed integrally.

Usually, in a final product examination, an actual vehicle is used and the examination is performed using the method below. Specifically, motor current that causes a prescribed torque is made to flow to the drive motor of the vehicle and the torque occurring in the output shaft is detected, thereby determining whether a prescribed torque occurs. If the result of the determination is that the prescribed torque is not exhibited, it is determined that the angle information of the rotational velocity sensor is skewed.

In such a final product examination, if calibration of the rotational velocity sensor (adjustment of the arrangement or the like) is performed, for example, each rotational velocity sensor arranged at the tip of the rotor shaft 310 of the vehicle has to be removed every time this calibration is performed. Since it is necessary to jack up the vehicle and perform calibration of the arrangement position of the rotational velocity sensor, a long amount of time is needed to calibrate a single rotational velocity sensor.

However, if a single unit is configured to include the rotor, the drive motor body, the rotational velocity sensor, and the magnetostrictive torque sensor formed integrally, such as in the present embodiment, it is possible to calibrate the arrangement position of the rotational velocity sensor relative to the unit instead of the actual vehicle, either before the unit is mounted in the actual vehicle or after the unit is removed from the actual vehicle.

Basically, motor current that causes a prescribed torque is made to flow to the unit and the torque occurring in the output shaft is detected, thereby determining whether a prescribed torque occurs. If the result of the determination is that the prescribed torque is not exhibited, it is determined that the angle information of the rotational velocity sensor of the unit is skewed.

Then, if calibration of the rotational velocity sensor (adjustment of the arrangement or the like) is performed, for example, it is possible to perform the calibration while removing the rotational velocity sensor from the unit, and not from the actual vehicle. Since the unit is smaller than the actual vehicle, the unit is easier to handle and it is possible to perform the calibration of the arrangement position of the rotational velocity sensor in a short time.

[5] The final product examination method according to a second aspect of the present invention is an examination method of a final product in which is mounted the drive motor described above in the first aspect, the method comprising determining whether a prescribed torque occurs, by causing a motor current for generating the prescribed torque to flow and detecting torque with the magnetostrictive torque sensor; and if a result of the determination is that the prescribed torque is not exhibited, determining that an arrangement angle of a rotational velocity sensor is skewed.

Usually, in a final product examination, the examination is performed using an actual vehicle, but as described above, Since it is necessary to jack up the vehicle and perform calibration of the arrangement position of the rotational velocity sensor, a long amount of time is needed to calibrate a single rotational velocity sensor.

However, the drive motor also includes the magnetostrictive torque sensor, and therefore the examination can be performed with just the drive motor. As a result, it is possible to perform the calibration of the arrangement position of the rotational velocity sensor on the drive motor, and not on the actual vehicle, either before the drive motor is mounted in the actual or after the drive motor is removed from the actual vehicle. Since the drive motor is smaller than the actual vehicle, the drive motor is easier to handle and it is possible to perform the calibration of the arrangement position of the rotational velocity sensor in a short time.

According to the present embodiment, it is possible to easily perform calibration of a rotational velocity sensor (rotation number sensor) arranged in the drive motor and to reduce the number of steps in and the time needed for the final product examination process.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a flow chart shows the final product examination method according to the present embodiment.

DESCRIPTION OF THE PREFERRED EMBODIMENTS

The following describes the examples of preferred embodiments of the drive motor and the final product examination method according to the present invention, while referencing FIGS. 1 to 4.

Figure 1:
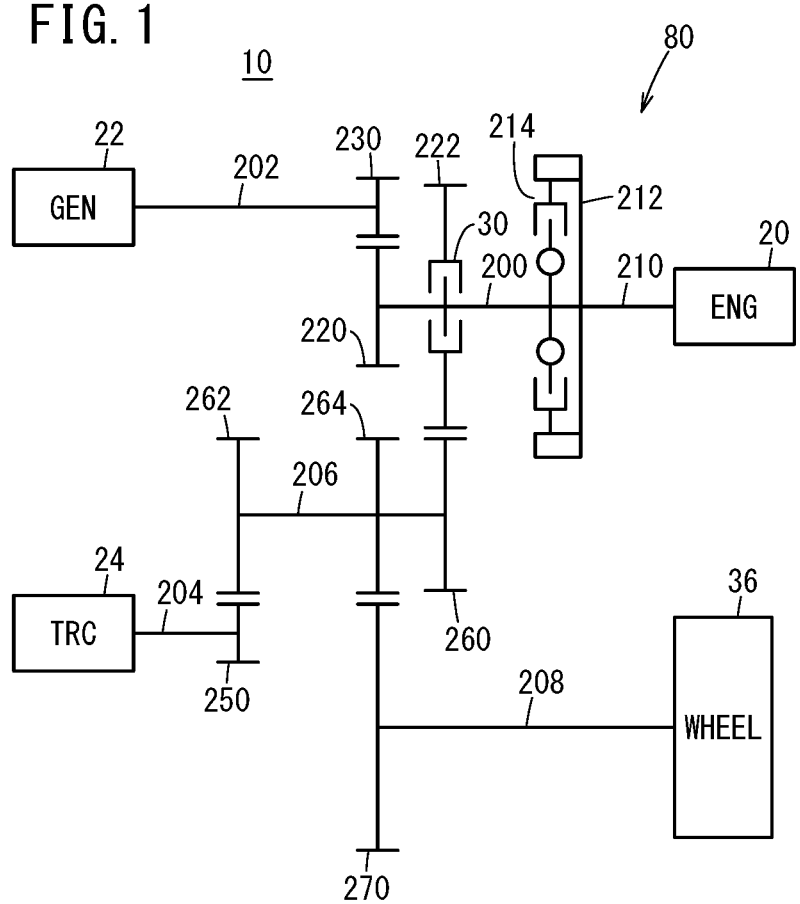
FIG. 1 is an abbreviated view of a mechanical linkage relationship of the drive system of the vehicle in which the drive motor is mounted, according to the present embodiment.

First, a vehicle 10 in which a drive motor 100 (see FIG. 2) according to the present embodiment is mounted is described simply, while referencing FIG. 1.

The vehicle 10 is a so-called hybrid vehicle. As shown in FIG. 1, the vehicle 10 includes an engine 20, a first rotating electric machine 22, a second rotating electric machine 24, an engine clutch 30, and a wheel 36. In FIG. 1, the first rotating electric machine 22 is labeled as "GEN" and the second rotating electric machine 24 is labeled as "TRC".

A drive system 80 of this vehicle 10 includes an engine shaft 200, a generator shaft 202, a motor shaft 204, a counter shaft 206, and a wheel output shaft 208. The engine 20 is connected to the engine shaft 200, via a crank shaft 210, a drive plate 212, and a damper 214. The engine clutch 30, a first engine shaft gear 220, and a second engine shaft gear 222 are arranged on the engine shaft 200.

The generator shaft 202 includes a generator shaft gear 230 that engages with the first engine shaft gear 220 of the engine shaft 200. The motor shaft 204 includes a motor shaft gear 250 that engages with a second counter shaft gear 262 of the counter shaft 206. The counter shaft 206 includes a first counter shaft gear 260, the second counter shaft gear 262, and a third counter shaft gear 264.

The first counter shaft gear 260 engages with the second engine shaft gear 222 of the engine shaft 200. The second counter shaft gear 262 engages with the motor shaft gear 250 of the motor shaft 204. The third counter shaft gear 264 engages with an output shaft gear 270 of the wheel output shaft 208. A differential apparatus, not shown in the drawings, is provided to the wheel output shaft 208. Each shaft 200, 202, 204, 206, and 208 is a torque transmission shaft that transmits torque to the wheel 36.

When the engine 20 operates while the engine clutch 30 is in a disconnected state, the first rotating electric machine 22 generates power due to the engine torque. When the engine 20 operates while the engine clutch 30 is in a connected state, the engine torque is transmitted to the wheel 36 via the engine shaft 200, the counter shaft 206, and the wheel output shaft 208. When the engine clutch 30 is in the connected state, the first rotating electric machine 22 may generate power due to the engine torque, or the first rotating electric machine 22 itself may generate torque for driving the vehicle.

When the second rotating electric machine 24 operates while the engine clutch 30 is in the disconnected state, motor torque is transmitted to the wheel 36 via the motor shaft 204, the counter shaft 206, and the wheel output shaft 208. When the vehicle 10 decelerates, rotational torque is input to the second rotating electric machine 24 through the reverse of this path, so that the second rotating electric machine 24 regenerates. Furthermore, when the engine 20 and the second rotating electric machine 24 operate while the engine clutch 30 is in the connected state, the engine torque and the motor torque are transmitted to the wheel 36.

The configuration of the drive system 80 is not limited to the configuration shown in FIG. 1. For example, a configuration similar to the configuration described in Japanese Laid-Open Patent Publication No. 2017-100590, for example, may be used for the drive system 80 (for example, see FIG. 2 in Japanese Laid-Open Patent Publication No. 2017-100590).

Figure 2:
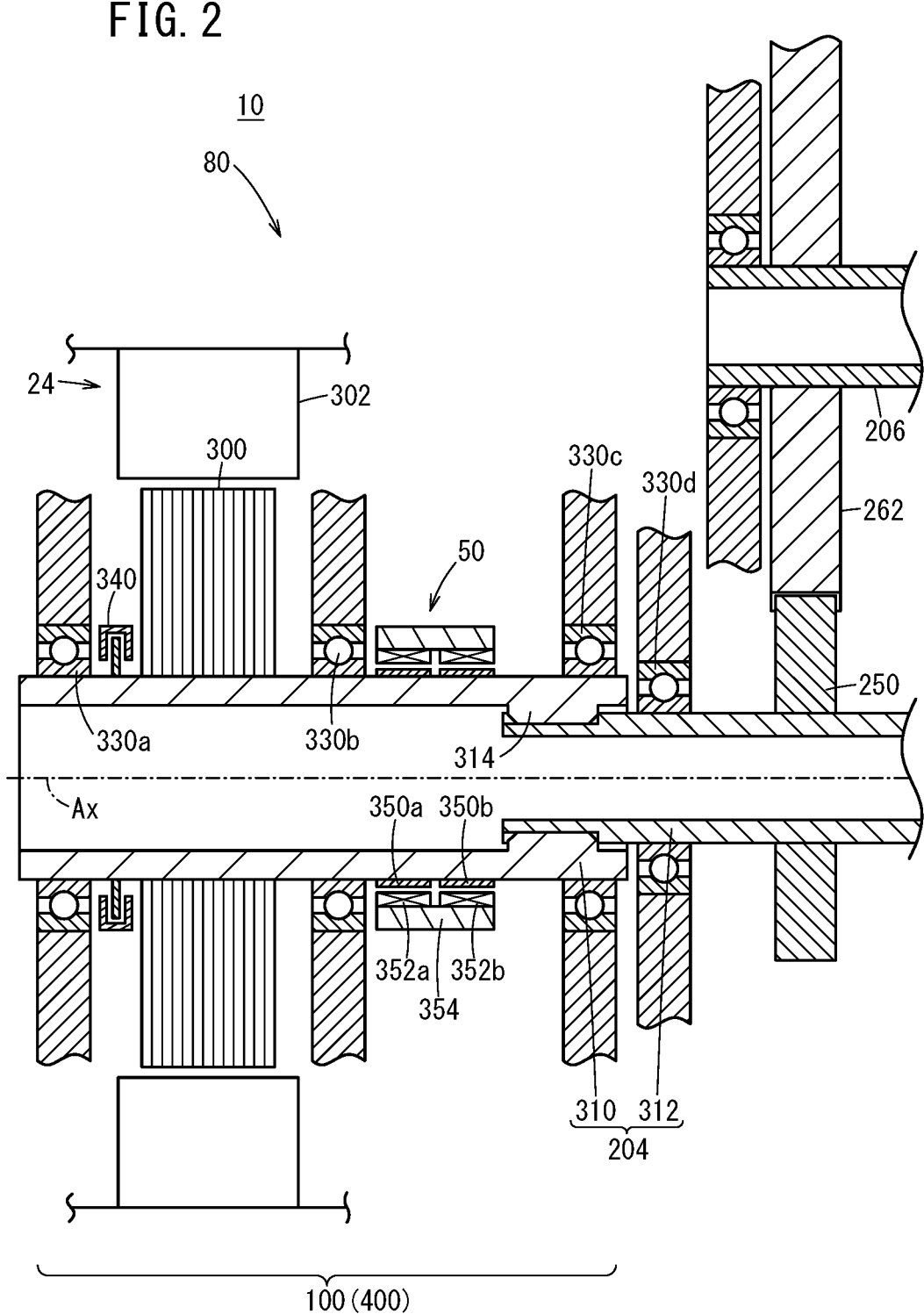
FIG. 2 is a cross-sectional view of an exemplary arrangement of the torque sensor in the drive motor according to the present embodiment.

As shown in FIG. 2, the second rotating electric machine 24 includes the drive motor 100. This drive motor 100 includes a rotor 300 and a stator 302, in addition to the motor shaft 204. The rotor 300 rotates about a rotational axis Ax. The motor shaft 204 includes a rotor shaft 310 arranged inside the rotor 300 and an output shaft 312 joined to the rotor shaft 310. The output shaft 312 is joined to the rotor shaft 310 by a spline joint 314. A drive motor similar to the drive motor 100 may also be included in the first rotating electric machine 22.

In the present embodiment, the joining between the rotor shaft 310 and the output shaft 312 is realized by the spline joint 314, but the joining is not limited to this. A coupling joint or another joint structure or the like can be favorably applied.

The motor shaft 204 is formed by a soft magnetic body. The soft magnetic body is carbon steel or alloy steel (chromium steel, chromium molybdenum steel, or the like), for example. The motor shaft 204 is rotatably supported by a first bearing 330a, a second bearing 330b, a third bearing 330c, a fourth bearing 330d, and the like. In other words, the rotor shaft 310 is rotatably supported by the first bearing 330a, the third bearing 330c, and the second bearing 330b, which are respectively arranged at the ends and the center portion of the rotor shaft 310.

Furthermore, the drive motor 100 includes a rotational velocity sensor 340. The rotational velocity sensor 340 is arranged near one end of the rotor shaft 310 that is an end protruding from the rotor 300 and is on the opposite side of the output shaft 312, i.e. near an end that is not the torque transmission path. Specifically, the rotational velocity sensor 340 is arranged between the first bearing 330a and the rotor 300, on the rotor shaft 310. The rotational velocity sensor 340 is formed by a resolver, for example, and detects the rotational velocity Ntrc [rpm] of the drive motor 100, as a number of rotations per unit time.

As shown in FIG. 2, in the drive motor 100 according to the present embodiment, a magnetostrictive torque sensor 50 (referred to simply as the torque sensor 50 below) is arranged at a position near the rotor 300 on the rotor shaft 310, e.g. a position between the second bearing 330b and the spline joint 314, to detect the torque Tr occurring in the rotor shaft 310.

The torque sensor 50 includes a plurality of magnetostrictive layers 350a and 350b and a plurality of coils 352a and 352b. The magnetostrictive layers 350a and 350b (magnetostrictive films) are arranged on the outer circumferential surface of the rotor shaft 310. The magnetostrictive layers 350a and 350b are formed by plating. Alternatively, the magnetostrictive layers 350a and 350b may be formed by grooves resulting from knurling, magnetostrictive metal films affixed with an adhesive, or press-fitted annular magnetostrictive metal members. On the other hand, the coils 352a and 352b are arranged inside a cylinder 354 secured to a support member, not shown in the drawings.

When the torque sensor 50 is arranged, the rotor 300, the second bearing 330b, and the torque sensor 50 are preferably arranged in the stated order from the drive motor 100 toward the output side. For example, when directly attaching the motor shaft 204 to the wheel 36, there is an advantage that the torque sensor 50 can be easily arranged. Furthermore, since the second bearing 330b realizes the role of a magnetic shield for the magnetism generated from the rotor 300 and the like, it is possible to restrict the effect of magnetism on the torque sensor 50.

The torque sensor 50 may be arranged at a position corresponding to the spline joint 314, but the torque sensor 50 undesirably detects the stress occurring in the spline joint 314 in this case, and so this arrangement is not preferable in terms of increasing the accuracy of the sensing of the actual torque.

Figure 3A:
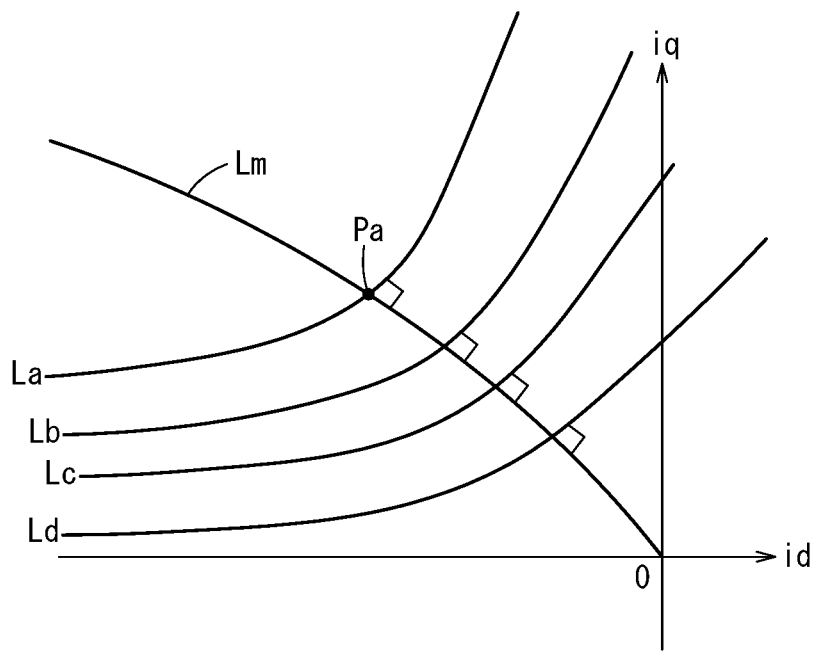
FIG. 3A is a descriptive diagram showing the characteristics for the drive motor that serve as a reference, and in particular, shows a case in which an operating point is obtained by converting the three-phase (u, v, w) coordinate system of alternating current that is the drive current into the two-phase (id, iq) coordinate system of direct current.
Figure 3B:
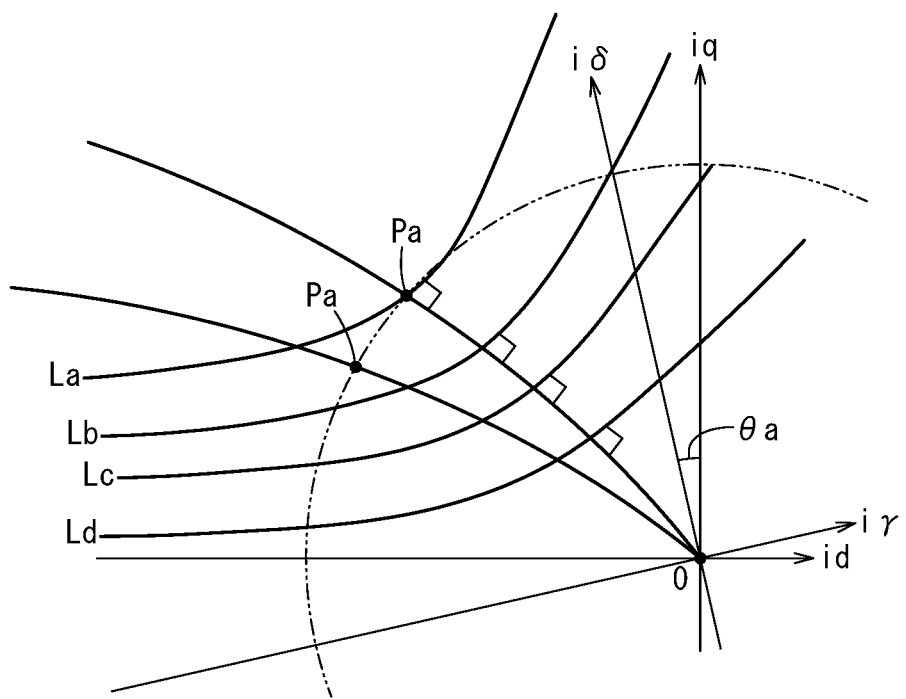
FIG. 3B is a descriptive diagram shows the operating point in a case where the angle error exceeds the error range for the arrangement of the rotational sensor.

Next, the final product examination method according to the present embodiment is described, while referencing FIGS. 3A to 4. The drive motor 100, a vehicle in which the drive motor 100 is mounted, and the like are examples of a final product.

First, a drive motor 100, specifically a drive motor 100 in which a rotational velocity sensor 340 is arranged as specified, is supplied with the drive current, and the characteristics of this drive motor 100 are acquired to serve as a reference.

At this time, the rotor shaft 310 of the drive motor 100 is held in a state whereby the rotation is stopped by outside force, such that an accurate torque can be obtained by the torque sensor 50. If the final product is the drive motor 100, the rotor shaft 310 is held in a rotationally stopped state using a vise or the like, for example. If the final product is a vehicle, the rotor shaft 310 of the drive motor 100 is held in the rotationally stopped state by manipulating a brake.

The above characteristics are obtained by converting a three-phase (u, v, w) coordinate system of alternating current that is the drive current into an orthogonal region that is a two-phase (id, iq) coordinate system of direct current, and as shown in FIG. 3A for example, equal torque curves in a case where a preset plurality of torque curves are output are obtained. In the example of FIG. 3A, a case is shown in which 50 Nm, 100 Nm, 150 Nm, and 200 Nm equal torque curves Ld, Lc, Lb and La are obtained. Furthermore, a curve orthogonal to each of the equal torque curves La to Ld from the origin O, i.e. a maximum phase curve Lm, is obtained.

Among these curves, an operating point is determined as an examination target. For example, in a case where 200 Nm is designated as the torque command value for the drive motor 100, the intersection point between the equal torque curve La for the torque command value (200 Nm) and the maximum phase curve Lm is the operating point Pa for the torque command value.

At the stage when the operating point Pa is obtained, the examination is performed on the drive motor 100 that is the examination target. The examination is performed by supplying the drive motor 100 that is the examination target with a drive current corresponding to the operating point Pa obtained in the manner described above. In this case as well, the rotor shaft 310 of the drive motor 100 that is the examination target is held in a rotationally stopped state by an external force, such that an accurate torque can be obtained by the torque sensor 50.

The torque occurring in the rotor shaft 310 is detected by the torque sensor 50. If the torque Tr (actual torque) detected by the torque sensor 50 is the torque command value, or within an acceptable error range of the torque command value, it is determined that the rotational velocity sensor 340 is arranged as specified in the drive motor 100. The error range is preferably set according to a predetermined threshold value Tth.

On the other hand, if the angle error for the arrangement of the rotational velocity sensor 340 is outside of the error range described above, the two-phase (iq, id) coordinate system becomes a two-phase (iδ, iγ) coordinate system obtained by rotating the two-phase (iq, id) coordinate system by the angle difference θa. In accordance with the rotation of the two-phase coordinate system, the operating point Pa is also rotated, to be shifted from the equal torque curve La for the torque command value (200 Nm). In the example in the drawing, a case is shown in which a torque (e.g. 175 Nm) that is lower than the torque command value (200 Nm) is sensed as the operating point Pa.

The angle error is then calculated based on the torque command value and the actual torque detected by the torque sensor 50, and the arrangement position of the rotational velocity sensor 340 is then corrected (calibrated).

Next, the examination method of the final product described above is described, while referencing the flow chart of FIG. 4. This examination method shows the processes from a stage at which the torque command value is determined by the drive motor 100 as a reference.

First, at step S1 of FIG. 4, the rotor shaft 310 of the final product that is the examination target is held in a rotationally stopped state by an external force. At this time, if the final product is the drive motor 100, for example, the rotor shaft 310 is held in the rotationally stopped state using a vise or the like, for example. If the final product is a vehicle, the rotor shaft 310 of the drive motor 100 is held in the rotationally stopped state by manipulating the brake.

After this, at step S2, the torque command value is output to the final product. For example, if the final product is the drive motor 100, the torque command value is output through an examination apparatus formed by a computer, for example. If the final product is a vehicle, the torque command value is output through an ECU mounted in the vehicle.

At step S3, the actual torque is acquired from the torque sensor 50 equipped in the final product. The data of the acquired actual torque is stored in a memory of the examination apparatus or a memory of the ECU.

At step S4, the examination apparatus or ECU determines whether the absolute value of the difference between the torque command value and the actual torque, i.e. the angle difference, exceeds a preset error range (determination threshold value Tth).

If the angle error exceeds the determination threshold value Tth (step S4: YES), the process proceeds to step S5, and the arrangement position of the rotational velocity sensor 340 is adjusted based on the angle error. After this, the processes of step S2 and onward are repeated.

At step S4, if the angle error is less than or equal to the determination threshold value Tth (step S4: NO), the examination ends.

In this way, in the present embodiment, the drive motor 100 in which a torque sensor 50 is arranged on an outer circumference of a shaft includes a rotor 300, a rotor shaft 310 arranged inside the rotor 300, and an output shaft 312 that is joined to the rotor shaft 310 by a joint having a loose element and transmits the rotational force of the rotor shaft 310 to the output side, wherein the torque sensor 50 is arranged on an upstream side of the joint in a range not overlapping with the joint.

The spline joint 314, a coupling joint, or the like are examples of the joint having a loose element, but the joint having a loose element is not limited to these examples, and other joint structures can be favorably used as long as it is a joint with a loose element.

By arranging the torque sensor 50 on the upstream side of the joint, it is possible to easily sense the output characteristics of the drive motor 100. Therefore, it is also possible to easily calibrate a prescribed characteristic of the drive motor 100, based on the output characteristic of the drive motor 100.

The present embodiment includes a second bearing 330b and the like that rotationally support the rotor shaft 310, and the torque sensor 50 is arranged closer to the output side than the second bearing 330b and the like. Since the rotor 300, the second bearing 330b and the like, and the torque sensor 50 are arranged in the stated order from the rotor 300 to the output side, the second bearing 330b and the like can function as a magnetic shield for the magnetism generated from the rotor 300 and the like. In this way, it is possible to restrict the occurrence of noise due to magnetic fields and the like.

The present embodiment includes a rotational velocity sensor 340 that senses the rotational velocity of the rotor 300, the rotational velocity sensor 340 is arranged on one end side of the rotor 300 that is not a torque transmission path, and the torque sensor 50 is arranged on another end side of the rotor 300 that is a torque transmission path.

By arranging the rotational velocity sensor 340 (rotation number sensor) at the one end side of the rotor 300, the rotational velocity sensor 340 is less affected by the torque transmitted in accordance with the rotation of the rotor 300, and it is possible to accurately sense the rotational velocity (number of rotations) of the rotor 300. Furthermore, by providing the torque sensor 50 at the other end side of the rotor 300, the torque sensor 50 is less affected by noise from the rotational velocity sensor 340, and it is possible to improve the torque detection accuracy.

Even if the rotational velocity sensor 340 loses functionality due to an impact or the like, it is possible to implement rotational control of the rotor 300 based on the torque sensed by the torque sensor 50. For example, by feeding back to the control section the difference between the torque command value from the control section that controls the drive motor 100 and the actual torque detected by the torque sensor 50, it is possible to implement rotational control of the rotor 300. In other words, rotational control using the torque sensor 50 can be made to function as a failsafe until the damaged rotational velocity sensor 340 is replaced with a normal rotational velocity sensor 340.

In the present embodiment, a drive motor body including the rotor 300 and the rotor shaft 310, the rotational velocity sensor 340, and the torque sensor 50 are formed integrally and constitute a single unit 400.

Usually, in a final product examination, an actual vehicle is used and the examination is performed using the method below. Specifically, motor current that causes a prescribed torque is made to flow to the drive motor of the vehicle and the torque occurring in the output shaft is detected, thereby determining whether a prescribed torque occurs. If the result of the determination is that the prescribed torque is not exhibited, it is determined that the angle information of the rotational velocity sensor 340 is skewed.

In such a final product examination, if calibration of the rotational velocity sensor 340 (adjustment of the arrangement or the like) is performed, for example, each rotational velocity sensor 340 arranged at the tip of the rotor shaft 310 of the vehicle has to be removed every time this calibration is performed. Since it is necessary to jack up the vehicle and perform calibration of the arrangement position of the rotational velocity sensor 340, a long amount of time is needed to calibrate a single rotational velocity sensor 340.

However, if a single unit 400 is configured to include the rotor 300, the drive motor body, the rotational velocity sensor 340, and the torque sensor 50 formed integrally, such as in the present embodiment, it is possible to configure the arrangement position of the rotational velocity sensor 340 relative to the unit 400 instead of the actual vehicle, either before the unit 400 is mounted in the actual vehicle or after the unit 400 is removed from the actual vehicle.

Basically, motor current that causes a prescribed torque is made to flow to the unit 400 and the torque occurring in the output shaft is detected by the torque sensor 50, thereby determining whether a prescribed torque occurs. If the result of the determination is that the prescribed torque is not exhibited, it is determined that the angle information of the rotational velocity sensor 340 of the unit 400 is skewed.

Then, if calibration of the rotational velocity sensor 340 (adjustment of the arrangement or the like) is performed, for example, it is possible to perform the calibration while removing the rotational velocity sensor 340 from the unit 400, and not from the actual vehicle. Since the unit 400 is smaller than the actual vehicle, the unit 400 is easier to handle and it is possible to perform the calibration of the arrangement position of the rotational velocity sensor 340 in a short time.

In the final product examination method of the present embodiment, motor current that causes a prescribed torque is made to flow and the torque detected by the torque sensor 50, thereby determining whether a prescribed torque occurs. If the result of the determination is that the prescribed torque is not exhibited, it is determined that the angle information of the rotational velocity sensor 340 is skewed.

Usually, in a final product examination, the examination is performed using an actual vehicle, but as described above, since it is necessary to jack up the vehicle and perform calibration of the arrangement position of the rotational velocity sensor 340, a long amount of time is needed to calibrate a single rotational velocity sensor 340.

However, the drive motor 100 also includes the torque sensor 50, and therefore the examination can be performed with just the drive motor 100. As a result, it is possible to perform the calibration of the arrangement position of the rotational velocity sensor 340 on the drive motor 100, and not on the actual vehicle, either before the drive motor 100 is mounted in the actual vehicle or after the drive motor 100 is removed from the actual vehicle. Since the drive motor 100 is smaller than the actual vehicle, the drive motor 100 is easier to handle and it is possible to perform the calibration of the arrangement position of the rotational velocity sensor 340 in a short time.

The present embodiment is not limited to the embodiments described above, and it is obvious that various configuration can be adopted based on the content recorded in this Specification.

What is claimed is:

1. A vehicular drive system comprising a wheel, a wheel output shaft connected to the wheel, and a drive motor configured to selectively rotate the wheel output shaft to drive the wheel, the drive motor comprising:
    a rotor;
    a rotor shaft arranged within the rotor; and
    a magnetostrictive torque sensor arranged on an outer circumference of the rotor shaft,
    wherein the drive system further comprises a torque output shaft that is joined to the rotor shaft by a joint having a loose element, the torque output shaft configured to transmit rotational force of the rotor shaft from an input side to an output side,
    the drive motor further comprising a first bearing that is supportively attached to the rotor shaft on the input side of the magnetostrictive torque sensor, and a second bearing that is supportively attached to the rotor shaft on the output side of the magnetostrictive torque sensor,
    wherein the magnetostrictive torque sensor is arranged on the input side of the joint, in a range not overlapping with the joint.

2. The vehicular drive system according to claim 1, further comprising:
    a rotational velocity sensor that senses rotational velocity of the rotor, wherein
    the rotational velocity sensor is arranged at one end side of the rotor that is not a torque transmission path, and
    the magnetostrictive torque sensor is arranged at another end side of the rotor that is a torque transmission path.

3. The vehicular drive system according to claim 1, wherein the drive motor is configured as a single unit in which a drive motor body including the rotor and the rotor shaft, a rotational velocity sensor, and the magnetostrictive torque sensor are formed integrally.

4. The vehicular drive system according to claim 1, wherein the rotor shaft and the torque output shaft are hollow shafts.

5. The vehicular drive system according to claim 1, wherein the torque output shaft is joined to the rotor shaft by a spline joint.

6. In a vehicle having a drive wheel, the improvement comprising a vehicular drive system comprising an engine selectively connectable to the wheel, a generator selectively connectable to the engine, and a brake regeneration motor operatively connected to the wheel, the brake regeneration motor comprising:
    a rotor;
    a rotor shaft arranged within the rotor;
    a first bearing that rotationally supports the rotor shaft;
    a magnetostrictive torque sensor arranged on an outer circumference of the rotor shaft, and
    a second bearing that is supportively attached to the rotor shaft on a side of the magnetostrictive torque sensor opposite the first bearing,
    wherein the drive system further comprises a torque output shaft that is joined to the rotor shaft by a spline joint and which transmits rotational force of the rotor shaft from an input side to an output side, wherein the magnetostrictive torque sensor is arranged closer to the output side than the first bearing, and wherein the magnetostrictive torque sensor is arranged on the input side of the joint, in a range not overlapping with the joint.

7. The vehicular drive system according to claim 6, further comprising:

a rotational velocity sensor that senses rotational velocity of the rotor, wherein the rotational velocity sensor is arranged at one end side of the rotor that is not disposed on a torque transmission path, and the magnetostrictive torque sensor is arranged at another end side of the rotor that is disposed on a torque transmission path.

8. The vehicular drive system according to claim 6, wherein the drive motor is configured as a single unit in which a drive motor body including the rotor and the rotor shaft, a rotational velocity sensor, and the magnetostrictive torque sensor are formed integrally.

9. The vehicular drive system according to claim 6, wherein the rotor shaft and the torque output shaft are hollow shafts.

\* \* \* \* \*